US006975355B1

(12) United States Patent
Yang et al.

(10) Patent No.: US 6,975,355 B1
(45) Date of Patent: *Dec. 13, 2005

(54) MULTIPLE SAMPLING VIA A TIME-INDEXED METHOD TO ACHIEVE WIDE DYNAMIC RANGES

(75) Inventors: David Xiao Dong Yang, Mountain View, CA (US); Zhonghan Deng, Albany, CA (US)

(73) Assignee: Pixim, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,786

(22) Filed: May 9, 2000

Related U.S. Application Data

(60) Provisional application No. 60/184,096, filed on Feb. 22, 2000, provisional application No. 60/184,095, filed on Feb. 22, 2000.

(51) Int. Cl.[7] ......................... H04N 5/335; H04N 5/235
(52) U.S. Cl. ....................... 348/308; 348/302; 348/362
(58) Field of Search ............................... 348/302, 308, 348/362, 367, 294, 297, 241, 298; 250/208.1, 250/214

(56) References Cited

U.S. PATENT DOCUMENTS

| | | | |
|---|---|---|---|
| 4,897,880 A * | 1/1990 | Wilber et al. ............... | 382/177 |
| 5,012,344 A | 4/1991 | Goto | |
| 5,107,103 A | 4/1992 | Gruss et al. | |
| 5,130,563 A | 7/1992 | Nabet et al. | |
| 5,182,658 A * | 1/1993 | Ishizaki et al. ............. | 358/483 |
| 5,272,535 A | 12/1993 | Elabd | |
| 5,309,243 A | 5/1994 | Tsai | |
| 5,329,109 A | 7/1994 | Kodoma | |
| 5,335,075 A * | 8/1994 | Komiya et al. ............. | 348/298 |
| 5,396,288 A | 3/1995 | Tsugita | |
| 5,403,772 A | 4/1995 | Zhang et al. | |

(Continued)

FOREIGN PATENT DOCUMENTS

EP     0 709 893 A2     5/1996    ........... H01L 27/12

(Continued)

*Primary Examiner*—David L. Ometz
*Assistant Examiner*—Lin Ye
(74) *Attorney, Agent, or Firm*—Carmen C. Cook; Patent Law Group LLP

(57) ABSTRACT

An architecture for a digital pixel sensor is disclosed in which the dynamic range of the sensor is increased by taking samples of a subject to be recorded, where each sample is taken over an interval of a different duration than the other samples. In the preferred embodiment of the invention, an array of pixel elements is fabricated in an integrated circuit. Each of the pixel elements outputs a digital signal and comprises a photodetector and an analog to digital converter. The photodetector is integrated with the analog to digital converter. An array of threshold memory cells, each corresponding to one of the pixel elements, is also provided. An array of time memory cells, each corresponding to one of the pixel elements, establishes a different sampling time for each of the pixel elements for each of multiple samples. An array of memory elements, each coupled to one of the pixel elements, is also provided. The memory elements are also fabricated in the integrated circuit. The memory elements only receive a value from a corresponding one of the pixel elements when the content in a corresponding one of the threshold memory cells permits. In this way, multiple samples may be collected for a subject to be recorded to thereby extend the dynamic range of a photodetector. Integration of the photodetector and the memory that implements this mechanism into the same integrated circuit avoids the latency that would be experienced if an external memory was used.

13 Claims, 5 Drawing Sheets

U.S. PATENT DOCUMENTS

| | | | |
|---|---|---|---|
| 5,461,425 A | 10/1995 | Fowler et al. | |
| 5,526,092 A * | 6/1996 | Iwasaki | 396/234 |
| 5,665,959 A | 9/1997 | Fossum et al. | |
| 5,703,353 A | 12/1997 | Blalock et al. | |
| 5,729,285 A | 3/1998 | Peterson et al. | |
| 5,769,384 A | 6/1998 | Baumgartner et al. | |
| 5,781,233 A | 7/1998 | Lamg et al. | |
| 5,801,657 A | 9/1998 | Fowler et al. | |
| 5,818,052 A | 10/1998 | Elabd | |
| 5,841,126 A | 11/1998 | Fossum et al. | |
| 5,872,596 A * | 2/1999 | Yanai et al. | 348/297 |
| 5,883,830 A | 3/1999 | Hirt et al. | |
| 5,886,353 A | 3/1999 | Spivey et al. | |
| 5,886,659 A | 3/1999 | Pain et al. | |
| 5,888,857 A | 3/1999 | Zhang et al. | |
| 5,892,540 A | 4/1999 | Kozlowski et al. | |
| 5,900,625 A | 5/1999 | Baumgartner | |
| 5,909,026 A * | 6/1999 | Zhou et al. | 250/208.1 |
| 5,917,960 A | 6/1999 | Sugawa | |
| 5,920,345 A | 7/1999 | Sauer | |
| 5,926,057 A | 7/1999 | Ogawa et al. | |
| 5,926,214 A | 7/1999 | Denyer et al. | |
| 5,949,064 A | 9/1999 | Chow et al. | |
| 5,953,060 A | 9/1999 | Dierickx | |
| 5,969,758 A | 10/1999 | Sauer et al. | |
| 5,973,311 A | 10/1999 | Sauer et al. | |
| 5,990,469 A | 11/1999 | Bechtel et al. | |
| 5,990,948 A | 11/1999 | Sugiki | |
| 6,040,570 A | 3/2000 | Levine et al. | |
| 6,069,365 A | 5/2000 | Chow et al. | |
| 6,069,376 A | 5/2000 | Merrill | |
| 6,071,826 A | 6/2000 | Cho et al. | |
| 6,175,383 B1 * | 1/2001 | Yadid-Pecht et al. | 348/302 |
| 6,229,133 B1 * | 5/2001 | Hynecek | 250/208.1 |
| 6,330,030 B1 * | 12/2001 | O'Connor | 348/297 |
| 6,373,050 B1 * | 4/2002 | Pain et al. | 250/261 |
| 6,452,152 B1 * | 9/2002 | Yang | 250/208.1 |
| 6,614,560 B1 * | 9/2003 | Silverbrook | 358/443 |
| 6,665,010 B1 * | 12/2003 | Morris et al. | 348/297 |
| 6,690,420 B1 * | 2/2004 | Liu | 348/241 |

FOREIGN PATENT DOCUMENTS

| | | | |
|---|---|---|---|
| EP | 0 725 357 A2 | 8/1996 | |
| EP | 0 86 899 A2 | 7/1997 | |
| EP | 0 725 357 A3 | 7/1997 | |
| EP | 0 786 897 A2 | 7/1997 | |
| EP | 0 786 897 A3 | 4/1998 | |
| EP | 0 709 893 A3 | 8/1998 | H01L 27/12 |
| EP | 0 86 899 A3 | 10/1998 | |
| EP | 0 893 915 A2 | 1/1999 | |
| EP | 0 915 518 A2 | 5/1999 | |
| EP | 0 915 619 A1 | 5/1999 | |
| EP | 0 917 358 A1 | 5/1999 | |
| EP | 0 928 102 A2 | 7/1999 | |
| EP | 0 948 122 A2 | 10/1999 | |
| EP | 0 954 167 A2 | 11/1999 | |
| EP | 0 967 656 A2 | 12/1999 | |
| EP | 0 893 915 A3 | 1/2000 | |
| JP | 04313949 A * | 11/1992 | H04N 1/04 |

* cited by examiner

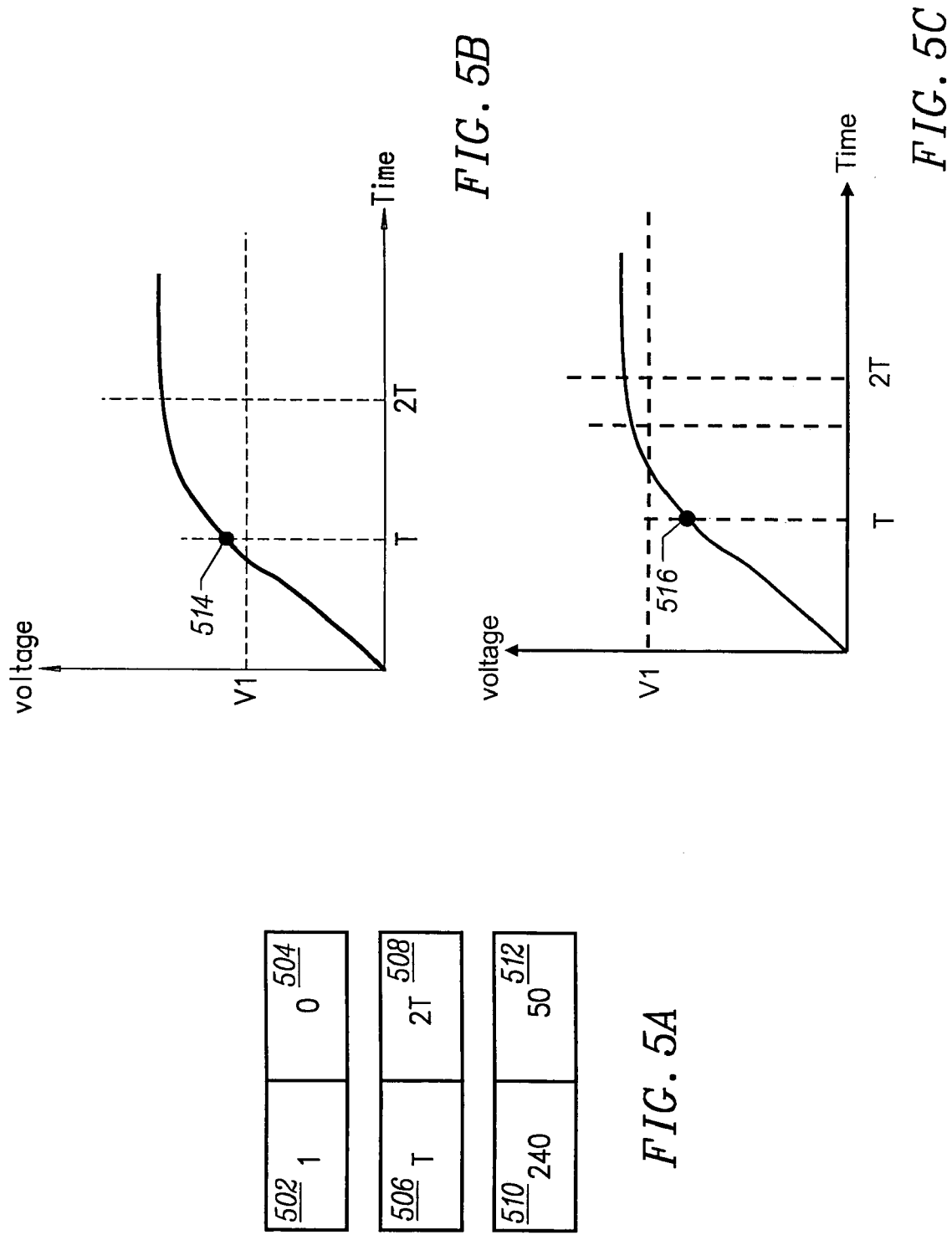

MULTIPLE SAMPLING VIA A TIME-INDEXED METHOD TO ACHIEVE WIDE DYNAMIC RANGES

CROSS-REFERENCE TO RELATED APPLICATION

This application is related to U.S. Pat. Nos. 5,461,425 and 5,801,657 and pending U.S. patent application Ser. No. 09/274,202, filed on Mar. 22, 1999, each of which is hereby incorporated by reference. This application claims priority from provisional patent application Nos. 60/184,095, filed Feb. 22, 2000 and 60/184,096 filed Feb. 22, 2000.

BACKGROUND OF THE INVENTION

1. Technical Field

The invention relates to image sensor systems. More particularly, the invention relates to an image sensor architecture and associated method for facilitating image multiple sampling using a time-indexed approach to achieve a wide dynamic range.

2. Description of the Prior Art

Digital photography is one of the most exciting technologies to have emerged during the twentieth century. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make the digital cameras one of the hottest new category of consumer electronics products.

Digital cameras, however, do not work in the same way as traditional film cameras do. In fact, they are more closely related to computer scanners, copiers, or fax machines. Most digital cameras use an image sensor or photosensitive device, such as charged-coupled device (CCD) or complementary metal-oxide semiconductor (CMOS) to sense a scene. The photosensitive device reacts to light reflected from the scene and can translate the strength of that reaction into a numeric equivalent. By passing light through red, green, and blue filters, for example, the reaction can be gauged for each separate color spectrum. When the readings are combined and evaluated via software, the camera can determine the specific color of each element of the picture. Because the image is actually a collection of numeric data, it can easily be downloaded into a computer and manipulated for more artistic effects.

Nevertheless, there are many cases in which digital cameras simply can not be used because of the limited resolution of the image sensors in today's digital cameras. Film-based photographs have immeasurably higher resolution than digital cameras. While traditional film-based technology typically has a resolution of tens millions of pixels, the image sensors in the digital cameras that could be produced at a price that is acceptable to consumers is slightly more than a million pixels today.

Dynamic range is another critical figure of merit for image sensors used in digital cameras. The dynamic range of an image sensor is often not wide enough to capture scenes with both highlights and dark shadows. This is especially the case for CMOS sensors which, in general, have lower dynamic range than CCDs.

Previously suggested solutions for widening the dynamic range of these devices can be divided into three categories:
Compressing the response curve;
Multiple sampling; and
Control over integration time.

The response curve is compressed by using a sensor that has a logarithmic response.

There are two ways of doing this:
The first approach is to use a CMOS sensor that operates in an instantaneous current read out mode. In this mode, the photocurrent generated by a photodetector is fed into a device that has a logarithmic response, for example a diode connected MOS transistor, to compress the sensor transfer curve. Although this scheme can achieve very wide dynamic range, the resulting image quality is generally poor due to a low signal-to-noise ratio (SNR).

The second approach to compress the response curve uses a technique referred to as well capacity adjusting. Here, the dynamic range is enhanced by increasing well capacity one or more times during exposure time. During integration well capacity is monotonically increased to its maximum value. The excess photo-generated charge is drained via an overflow gate. This scheme, however, suffers from large fixed pattern noise and degradation in the SNR.

In multiple sampling, a scene is imaged several times at different exposure times and the data are combined to construct a high dynamic range image. For this approach to work at reasonable capture times, the read out process must be performed at speeds much higher than normal active pixel sensor (APS) speeds. The multiple sampling scheme effectively achieves a wide dynamic range. In reality, much data may need to be read out, which can be particularly burdensome for many types of image sensors.

Controlling integration time is the third method that has some promising aspects in comparison with others. In essence, the exposure time of each pixel is individually adjusted so that they do not get saturated at the end of each integration period. There are many ways of achieving this.

One way is to place a set-reset flip-flop and an AND gate at each pixel to control the integration start time to achieve local exposure control. However, this approach suffers the following limitations:
Each pixel is large due to the inclusion of the flip-flop and the AND gate.
A large 'timestamp' memory is needed to store the exposure time of all pixels. The exposure time of each pixel can be determined by trying out various exposure times. When capturing a moving scene, the exposure times change so the 'timestamp' memory must be updated, which not only is burdensome but also causes image lag.
Moreover, in addition to the column and row decoders used for pixel read out, another column and row decoders are needed to control the flip-flops.

A second way is known for an individual pixel reset (IPR) to achieve local exposure control, namely a second reset transistor is added to the standard three-transistor APS design so that the integration start time of each pixel can be controlled externally. The second way keeps the pixel size small but requires a large external memory to store the exposure time for all of the pixels, and further requires memory refreshing and additional column and row decoders. Moreover, multiple reset pulses might need to be applied to each pixel throughout the reset period. The time control for resetting pulses could be quite complicated.

There is therefore a great need for a wide dynamic range image sensor that overcomes some of the above shortcomings and, in particular, outputs image data having a wide dynamic range. Further, the sensor should not require an external timestamp memory and control logic to update the exposure times.

SUMMARY OF THE INVENTION

An architecture for a digital pixel sensor is disclosed in which the dynamic range of the sensor is increased by taking samples of a subject to be recorded, where each sample is taken over an interval of a different duration than the other samples. The use of different recording intervals allows integration of multiple photodetector signals relative to a threshold value and thus expands the dynamic range of the photodetector without saturating the picture elements in the image.

In the preferred embodiment of the invention, an array of pixel elements is fabricated in an integrated circuit. Each of the pixel elements outputs a digital signal and comprises a photodetector and an analog to digital converter. The photodetector is integrated with the analog to digital converter.

An array of threshold memory cells, each corresponding to one of the pixel elements, is also provided. The threshold memory assures that a picture element which corresponds to a particular threshold memory cell does not exceed a threshold value and, therefore, does not provide a saturated signal for the picture element. Alternatively, the threshold memory assures that a signal in a picture element which corresponds to a particular threshold memory cell is read out into a data memory cell only when the signal exceeds a value in the particular threshold memory cell. In essence, the threshold memory avoids the readout of unnecessary values to the memory cells (discussed below).

An array of time memory cells, each corresponding to one of the pixel elements, establishes a different exposure time for each of the pixel elements for each of multiple samples.

An array of memory elements, each coupled to one of the pixel elements, is also provided. The memory elements are also fabricated in the integrated circuit. The memory elements only receive a value from a corresponding one of the pixel elements when the content in a corresponding one of the threshold memory cells permits. In this way, multiple samples may be collected for a subject to be recorded to thereby extend the dynamic range of a photodetector.

Integration of the photodetector and the memory that implements this mechanism into the same integrated circuit avoids the latency that would be experienced if an external memory was used.

BRIEF DESCRIPTION OF THE DRAWINGS

FIG. 5A is a block diagram which shows a pair of exemplary threshold memory cells, time index memory cells, and corresponding data memory cells according to the invention; and FIGS. 5B and 5C are graphs which show, respectively, two corresponding time integration processes according to the invention.

DETAILED DESCRIPTION OF THE INVENTION

In the following detailed description of the invention, some specific details are set forth to provide a thorough understanding of the presently preferred embodiment of the invention. However, it should be apparent to those skilled in the art that the invention may be practiced in embodiments that do not use the specific details set forth herein. Well known methods, procedures, components, and circuitry have not been described in detail to avoid unnecessarily obscuring the invention.

In the following discussion, in references to the drawings like numerals refer to like parts throughout the several views.

Figure 1A:
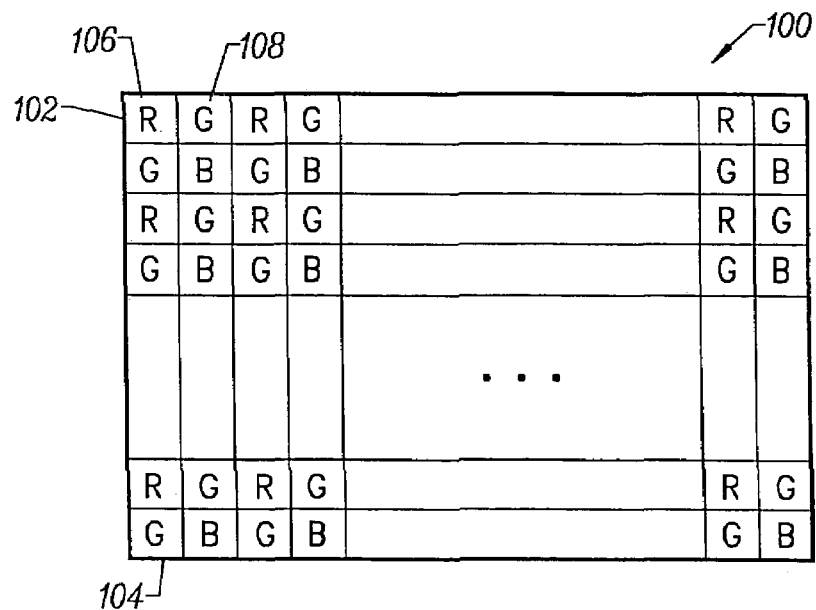
FIG. 1A is a block diagram that shows a CMOS image sensor or photosensitive chip in which the invention may be practiced.

FIG. 1A shows an image sensor or photosensitive chip 100 in which the invention may be practiced. The image sensor 100 may be used in an image capturing device (e.g. a digital camera) for either stationary or video photography, and produces digital image data. The photosensitive chip 100, which is typically fabricated on a substrate such as CMOS, comprises a plurality of photodetectors that are arranged in an array. For color applications, a mosaic of selectively transmissive filters is superimposed in registration with each of the photodetectors so that a first, second, and third selective group of photodetectors are made to sense three different color ranges, for example, the red, green, and blue range of the visible spectrum, respectively. The number of the photodetectors in the photosensitive chip 100 typically determines the resolution of digital images resulting therefrom. The horizontal resolution is a function of the number of photodetectors in a row 102, and the vertical resolution is a function of the number of photodetectors in a column 104.

Figure 1B:
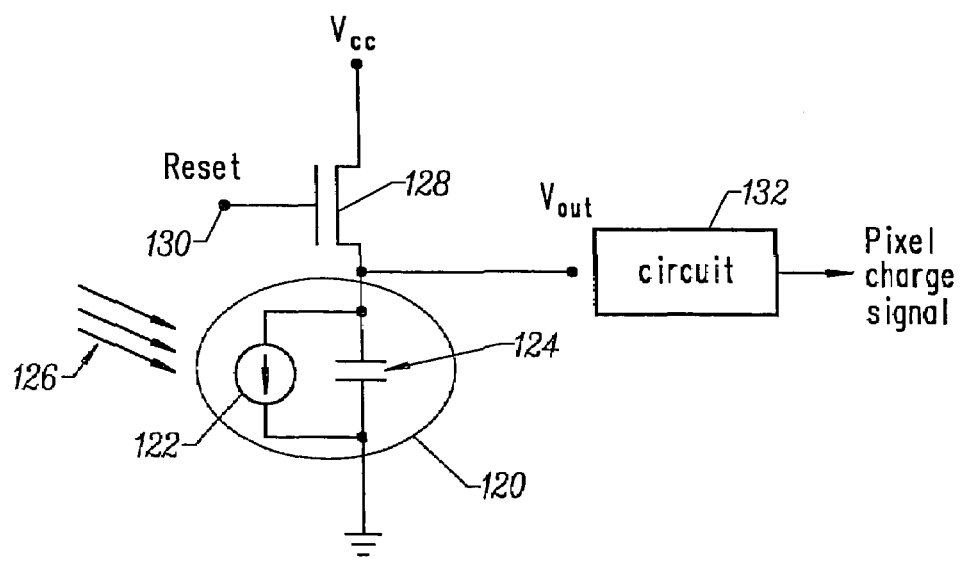
FIG. 1B is a block diagram which shows a photodiode modeled as a current source and a capacitor.

Each of the photodetectors comprises a photosensor that produces an electronic signal when it is exposed to light. Generally, the photosensor is a photodiode or a photogate in a CMOS sensor. FIG. 1B shows a photodiode 120 that is modeled as a current source 122 and a capacitor 124. When a reset signal is applied at a Reset terminal 130, the capacitor 124 is fully charged by and nearly to Vcc through the transistor 128, at which point the photodiode 120 is ready for light integration.

As soon as the reset signal is dropped (i.e. the voltage level is changed), light integration starts. As more and more incident photons from light 126 strike the surface of the photodiode 120, the current of current source 122 increases. The capacitor 124 starts to discharge through the current source 122. Typically, the photodiode collects more photons for higher photon intensities and, as a result, the resistance of the resistor 122 decreases. Consequently, a faster discharge signal Vout is produced. In other words, the signal from Vout is proportional to the incident photons which strike the photodiode 120. This signal is alternatively referred to herein as an electronic signal or pixel charge signal. Optionally, a circuit 132 may be employed to enhance the electronic signal Vout to a desired level so that the output, i.e. the pixel charge signal, is effectively coupled to following circuitry.

Operation of an image sensor comprises two processes:
The light integration process, as described above; and
The read out process.

Each of these two processes is sustained for a controlled time interval. In the light integration process, each photodetector is initiated to accumulate incident photons of the light and the accumulation is reflected as a pixel charge signal. After the light integration process, the photodetectors start the read out process during which the pixel charge signal in each photodetector is read out via read out circuitry to a data bus or video bus. The interval during which the light integration process proceeds is referred to as exposure control or electronic shuttering, and it controls how much charge is accumulated by each of the photodiodes.

Figure 2:
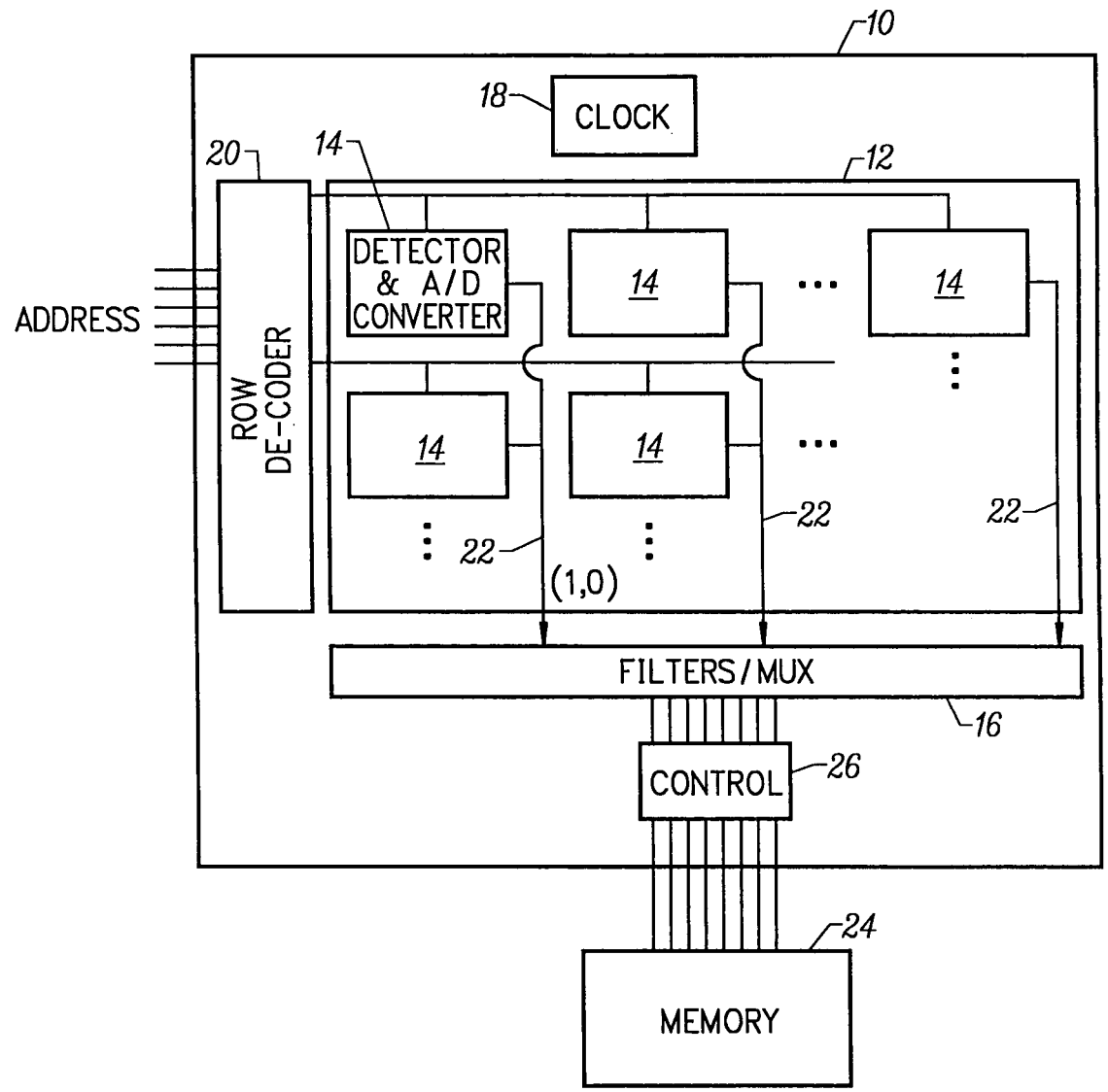
FIG. 2 is a block diagram which shows the architecture of a digital pixel sensor, as described in U.S. Pat. No. 5,461,425.

FIG. 2 duplicates FIG. 1 of U.S. Pat. No. 5,461,425 and shows that each photodetector 14 includes an A/D converter in addition to a photosensor. Each of the photodetectors is referred to as a sensor pixel or a element or digital pixel. This is done to indicate that the photodetector herein includes an analog-to-digital conversion circuit, as opposed to a photodetector which is commonly seen in a conventional image sensor, and which includes a photosensor and produces an analog signal. Further, the pixel element herein is different from a conventional image sensor because it outputs digital signals that can be read out at a much higher speed than an analog signal can be read out in a conventional image sensor. Hence, the resultant image sensor (DPS) is considered a digital pixel sensor. The preferred embodiment of the invention is based on such architecture in which a sensor element includes a photosensor and an analog-to-digital conversion circuit.

The image sensor of FIG. 2 is formed on a single integrated circuit chip 10. The image sensor core 12 comprises a two-dimensional array of light detecting elements, each connected to a dedicated A/D converter which outputs a stream of bits representative of the analog output of the light detecting element. The combination of a light detecting element and A/D converter constitutes a single pixel element 14. Each pixel element 14 includes identical circuitry. Digital filters 16 on chip 10 are connected to receive the digital streams from each pixel element 14 and convert each digital stream to an eight-bit byte representative of one of 256 levels of light intensity detected by the respective pixel element 14.

In operation, an image is focused on the image sensor core 12 such that a different portion of the focused image impinges on each pixel element 14. Each light detecting element comprises a phototransistor whose conductivity is related to the intensity of light impinging upon the base of the phototransistor. The analog current through the phototransistor thus corresponds to the intensity of light impinging upon the phototransistor. The analog signals from all phototransistors in the core 12 are simultaneously converted into serial bit streams output from dedicated A/D converters clocked using a common clock driver 18. The serial bit streams, over a period of time, i.e. over a frame period, can then be processed by filters 16 (on-chip or off-chip) to derive a signal representative of the intensity of light impinging on the phototransistor.

After each clock cycle, one bit is latched at an output of each A/D converter within each pixel element 14. To now transfer each bit generated by the pixel elements 14 to the filters 16 after each clock cycle, each of the rows of pixel elements 14 are addressed in sequence, using row decoder 20, until all rows of pixel elements 14 have been addressed. Upon addressing each row, the one-bit output of each pixel element 14 in the addressed row is coupled to a corresponding bit line 22. The filters 16 process the bit stream from each pixel element 14 to generate an eight-bit value per pixel element 14 corresponding to the average intensity of light impinging on the respective pixel element 14 for that frame period. These eight-bit values may then be output from the chip 10, using a suitable multiplexer or shift register, and temporarily stored in a bit-mapped memory 24. The memory 24 may then act as a frame buffer, where the light intensity values in memory 24 are sequentially addressed for controlling the light output of corresponding pixels in a monitor.

In a particular embodiment of FIG. 2, assume that sixty-four separate filters 16 are used for converting the bit streams output on sixty-four bit lines 22 to eight-bit values. (A multiplexer at the output of the core 12 may reduce the number of required filters to, for example, sixteen.) The preferred interaction of filters 16 with memory 24 is as follows. Immediately after a row of pixel elements 14 has been addressed, a control circuit 26, using the address generated by row decoder 20, fetches a previous (or interim) eight-bit value stored in memory 24 for each pixel element 14 in the addressed row and loads this previous value into the proper one of the 64 filters 16 about to receive a new bit from that pixel element 14. Conventional memory addressing techniques and circuitry may be used for this process. The single bit output of the respective A/D converters in the addressed pixel elements 14 is then applied to a respective one of the sixty-four filters 16 containing the previous eight-bit value for that pixel element 14. Each filter 16 then updates the previous eight-bit value with the new single bit of information to generate a new interim value. The now updated eight-bit value generated by each filter 16 is then transferred back into memory 24, under control of the control circuit 26.

Figure 3:
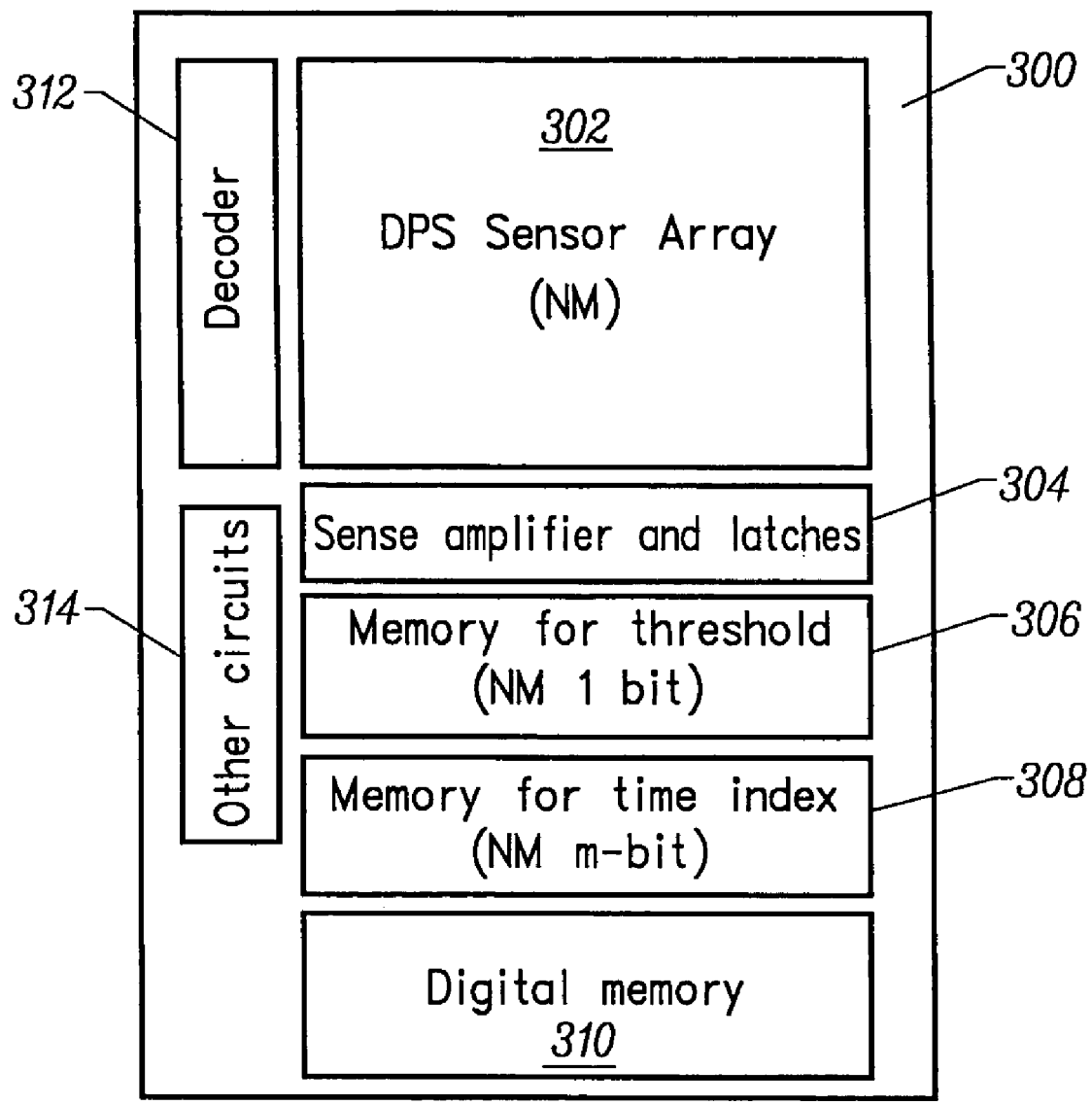
FIG. 3 is a block diagram which shows an image sensor that includes a threshold memory, a time index memory, and a separate data memory, where each of the memories and the digital pixel sensor are integrated into the same sensor according to the invention.

Referring to FIG. 3, there is shown an image sensor 300 based on the digital pixel sensor according to one embodiment of the invention. The digital pixel sensor 302 may be implemented according to U.S. Pat. No. 5,461,425 or U.S. Pat. No. 5,801,657, and outputs digital signals representing one or more images of a scene. A sense amplifier and latches 304 are coupled to the digital pixel sensor 302 to facilitate read out of the digital signals from the digital pixel sensor 302. Unlike the prior art, an image sensor 300 in accordance with the invention also includes a memory 304 (referred to herein as a threshold memory) for storing threshold values, a memory 308 (referred to herein as a time index memory) for storing time index values, and a digital or data memory 310 that is large enough to accommodate a frame of image data from sensor 302.

According to one embodiment of the invention, it is assumed that the sensor 302 is of N by M pixels and has k-bits. Thus, the size of the threshold memory 306 is of N by M bits, and the size of the time index memory 308 is of N by M by m bits, where m is the time resolution. The presently preferred pixel resolution of sensor 302 is 1000 by 1000 in 10 bits. Thus, the threshold memory 306 is a one-megabit memory, the time index memory 308 is a two-megabit memory when the time index is set to be T, 2T, 4T and 8T (i.e. two-bit resolution), and the digital memory 306 preferably has a size of at least 1.2 megabytes.

As a result of the above memory configuration, each of the pixel elements in the sensor 302 can be stamped by each of the memory cells in the threshold memory 306, the time index memory 308, and the data memory 310.

Figure 4:
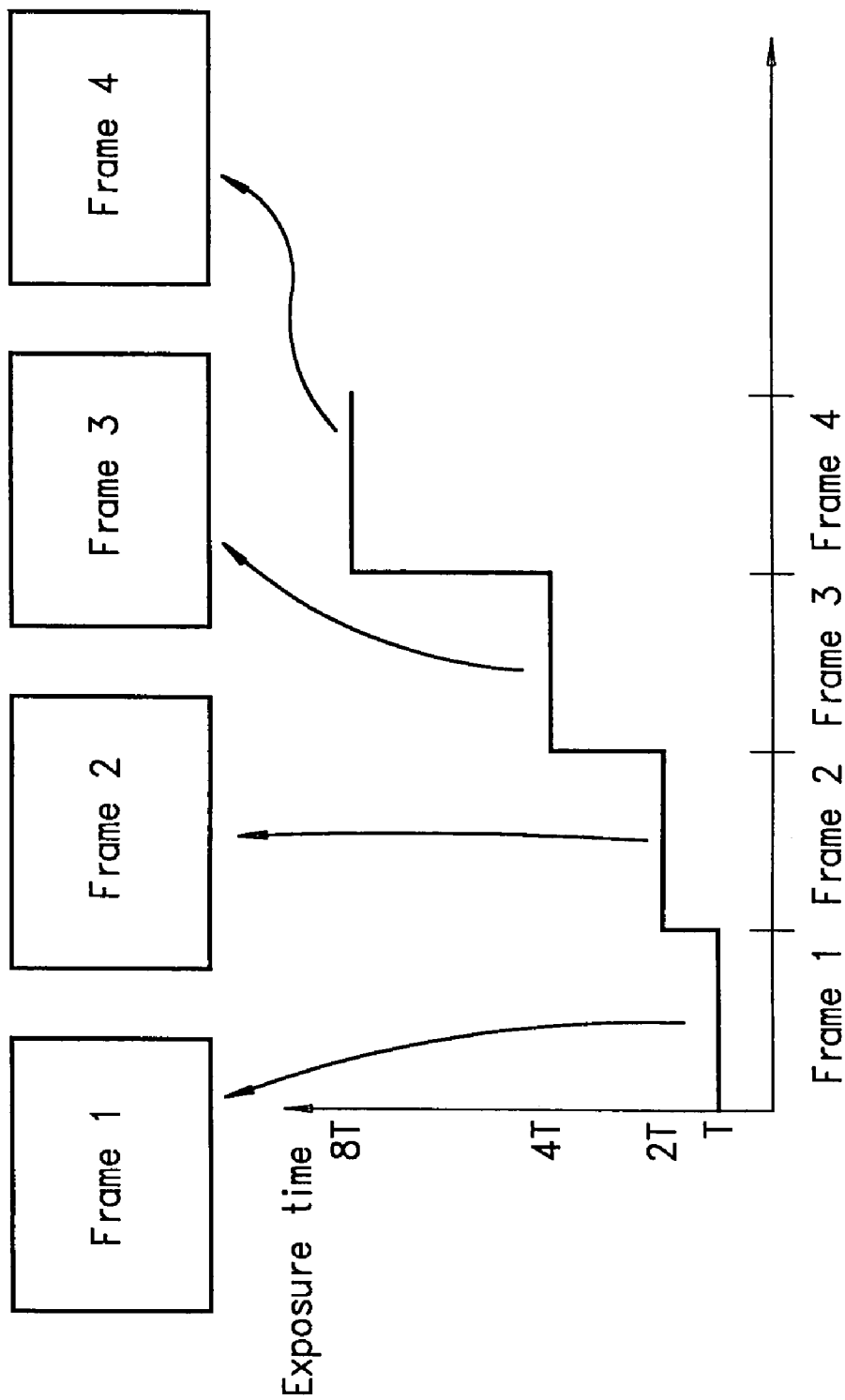
FIG. 4 is a graph which shows an example of multiple exposures.

In operation, at each of the time indexes, for example, T, 2T, 4T and 8T, the sensor 302 is exposed to a target multiple (e.g. four) times, resulting in four images at four different exposure times. FIG. 4 shows an example of the multiple exposures. As shown in FIG. 4, frame 1 is created after time T, frame 2 is created after time 2T, frame 3 is created after time 4T, and frame 4 is created after time 8T. One of the advantages of having multiple images of the same target is the ability to expand the dynamic range of the image thus captured. Because of the relative short exposure time, frame 1 typically captures information that is related to high illumination areas in the target. Likewise, because of the relatively long exposure time, frame 4 typically captures information that is related to low illumination areas in the target. Frame 2 and frame 3 thus capture information that is related to gradually increased illumination areas in the target. As a result, the combination of the multiple images provides a very wide dynamic range.

Generally, each of the frames is read out to a memory so that subsequent processing to combine the frames is possible. The architecture illustrated on FIG. 2 shows that the image data are read out to a memory 24 through a plurality of lines (e.g. pins of sensor 10). Given the exposure times, the generated image data must be read out fast enough so that it does not affect the following frame. As is well known, the number of lines is limited to a practical packaging solution and often far less than what is needed to accommodate the required speed. Therefore, the limited number of the lines becomes a bottleneck for data transmission from the sensors 14 to the memory 24.

One of features in the invention is to place an on-chip memory in the image sensor, shown as the data memory 310 in FIG. 3. Thus, there is no bottleneck for data transmission from the sensors 302 to the memory 310. In operation, after one exposure time, a frame of data can be immediately read out to the memory 310.

According to one aspect of the invention, after the first frame of data is read out into the memory 310, the second frame of data is selectively read out into the memory 310 to improve, update, or enhance the pixel values contained therein. Selection is controlled by the contents of the corresponding threshold memory 306.

FIG. 5A shows a pair of exemplary threshold memory cells 502 and 504, exemplary time index memory cells 506 and 508, and exemplary corresponding data memory cells 510 and 512. After a first exposure time T, as shown in FIG. 5B, it is shown that the resultant signal 514 exceeds a predefined threshold V1. Thus, a flag, such as a binary value "1" which represents that the threshold value V1 has been exceeded, is stored in the cell 502, the exposure time T is stored in the cell 506, and the resultant signal or a representation thereof (e.g. the value 240 in eight-bit precision) is stored in the cell 510. The value of threshold V1 is usually so determined that further exposure to the photosensor that produces resultant signal 514 can cause the photosensor to become saturated. Therefore, in view of the flag in the cell 502, there is no need to enhance the value stored in the cell 510 after the first exposure time T. In reality, further update of the cell 510 could cause the loss of the data therein as it is now clear that the next value would be a saturated value.

It is now assumed that a resultant signal 516 produced by an adjacent photodetector is below the threshold V1, as shown in FIG. 5C. Therefore, the cell 504 does not store the flag "1," assuming that the cell 504 was reset to "0" when the operation starts. This permits the corresponding data cell 512 to be updated or enhanced with new value that results from a next exposure. It should be noted that the exact contents to be stored in the cells 502, 504, 506, or 508 depend largely on an implementation preference.

One of the key features of the invention is to provide a stamp on each of the photodetectors in the sensor 302 or each of the data cells in the memory 310 to prevent any saturated values from overwriting useful information in the memory 310. The contents in the time index memory are used individually so that the final image can be regenerated correctly. This allows the contents in the memory 310 to be updated properly after additional exposure times, or allows the frames of data to be combined properly, The advantages and benefits provided by the image sensor 300 are numerous:

One of the advantages is the elimination of the data transmission bottleneck presented in the architecture of U.S. Pat. No. 5,461,425.

Secondly, the integration of the on-chip memory 310 with the digital pixel sensor 302 does not affect the performance of the digital pixel sensor 302 but, rather, improves the overall performance of image sensor 300 significantly. Such improvements include that of matched bandwidth when reading out the digital signals from the digital pixel sensor 302.

Thirdly, a threshold memory is used to prevent the read out of unnecessary values to the data memory.

In addition, the time index memory is used to provide supporting (weighted) information for properly combining the frames of data to produce a final digital image having expanded dynamic range.

According to one embodiment of the invention, the architecture 200 is preferably implemented in a CMOS image sensor. The resultant image sensor may be advantageously employed in digital cameras that can provide superior or comparable image qualities as opposed to film image qualities.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

What is claimed is:

1. An image sensor, comprising:
  a sensor array comprising a two-dimensional array of pixel elements, each of said pixel elements of said sensor array outputting digital signals as pixel data representing an image of a scene, said digital signals being serial bit streams indicative of a light intensity impinging upon each pixel element, and said sensor array generating multiple sets of pixel data indicative of multiple representations of said image at a plurality of exposure times;
  a data memory, in communication with said sensor array, for storing said pixel data for each of said pixel, elements where said pixel data for each pixel element is associated with a representation of said image taken at one of said plurality of exposure times; and
  a threshold memory, in communication with said sensor array, for storing a threshold flag for each of said pixel elements, said threshold flag having a first value when said pixel data associated with a pixel element exceeds a predetermined threshold value and having a second value when said pixel data does not exceed the predetermined threshold value, wherein said threshold flag, once being set to said first value at one of said plurality of exposure times, retains said first value through the remaining exposure times of said plurality of exposure times, wherein said data memory stores pixel data for each pixel element associated with a representation of said image at each of the plurality of exposure times when said threshold flag in said threshold memory associated with the respective pixel element has said second value; and wherein said sensor array, said data memory and said threshold memory are fabricated in an integrated circuit.

2. The image sensor of claim 1, further comprising:

a time index memory, in communication with said sensor array, for storing a time index value for each of said pixel elements in said sensor array, said time index value indicating a respective one of said plurality of exposure times when said pixel data of a respective pixel element exceeds said predetermined threshold value, said time index memory being fabricated in said integrated circuit.

3. The image sensor of claim 1, wherein said sensor array is of N by M pixels and provides pixel data in k bits, said data memory is N by M by k bits and said threshold memory is N by M bits.

4. The image sensor of claim 2, wherein said sensor array is of N by M pixels and provides pixel data in k bits, said data memory is N by M by k bits, said threshold memory is N by M bits, and said time index memory is of N by M by m bits, where m is a time resolution.

5. The image sensor of claim 1, wherein said plurality of exposure times comprises any of a relatively short exposure time for capturing image information that is related to high illumination areas in said image, a relatively long exposure time for capturing image information that is related to low illumination areas in said image, and intermediate exposure times for capturing image information that is related to gradually increasing illumination areas in said image; and wherein a combination of said multiple representations of said image at a plurality of exposure time establishes a wide dynamic range for said sensor array.

6. The image sensor of claim 1, wherein said data memory stores pixel data for each pixel element associated with a first representation of said image at a first exposure time and at each subsequent exposure time, said data memory updates pixel data for a pixel element associated with subsequent representations of said image only when said threshold flag in said threshold memory associated with the respective pixel element has said second value.

7. A method for generating electrical signals representing an image in a digital image sensor, comprising:

generating digital signals as pixel data at a plurality of exposure times, multiple sets of pixel data being generated indicative of multiple representations of said image at said plurality of exposure times, said digital signals being serial bit streams generated at each pixel element in a sensor array of pixel elements formed on an integrated circuit and corresponding to a level of an analog signal indicative of a light intensity impinging on said pixel element;

providing a threshold memory on the same integrated circuit including a plurality of threshold flag, each threshold flag associated with a pixel element in said sensor array;

setting each threshold flag in said threshold memory to a first value;

at each exposure time before the last exposure time of said plurality of exposure times, determining if said pixel data of a first pixel element in said sensor array exceeds a predetermined threshold value;

if said pixel data exceeds said predetermined threshold value and said threshold flag associated with said first pixel element has said first value, storing said pixel data in a location in a data memory provided on the same integrated circuit associated with said first pixel element and setting said threshold flag associated with said first pixel element to a second value, said threshold flag having said second value for preventing further update of pixel data for said first pixel element, wherein said threshold flag, once being set to said second value at one of said plurality of exposure times, retains said second value through the remaining exposure times of said plurality of exposure times; and if said pixel data does not exceed said predetermined threshold value and said threshold flag associated with said first pixel element has said first value, storing said pixel data for said first pixel element in said location in said data memory.

8. The method of claim 7, further comprising:

if said pixel data exceeds said predetermined threshold value and said threshold flag associated with said first pixel element has said first value, storing a time index value in a location in a time index memory associated with said first pixel element, the time index value being indicative of said exposure time when pixel data exceeds said predetermined threshold value.

9. The method of claim 7, further comprising:

if said pixel data of said first pixel element does not exceed said predetermined threshold value before said last exposure time, storing said pixel data for said first pixel element recorded in the last exposure time in said data memory.

10. The method of claim 7, wherein said plurality of exposure times comprises any of a relatively short exposure time for capturing image information that is related to high illumination areas in said image, a relatively long exposure time for capturing image information that is related to low illumination areas in said image, and intermediate exposure times for capturing image information that is related to gradually increasing illumination areas in said image; and wherein a combination of said multiple representations of said image at a plurality of exposure time establishes a wide dynamic range for said sensor array.

11. A method for generating electrical signals representing an image in a digital image sensor, comprising:

generating digital signals as pixel data at a plurality of exposure times, multiple sets of pixel data being generated indicative of multiple representations of said image at said plurality of exposure times, said digital signals being serial bit streams generated at each pixel element in a sensor array of pixel elements formed on an integrated circuit and corresponding to a level of an analog signal indicative of a light intensity impinging on said pixel element;

providing a threshold memory on the same integrated circuit including a plurality of threshold flag, each threshold flag associated with a pixel element in said sensor array;

setting each threshold flag in said threshold memory to a first value;

at a first exposure time, storing said pixel data for each of said pixel elements of said sensor array in a data memory on the same integrated circuit;

determining if pixel data of each of said pixel elements exceeds a predetermined threshold value;

when said pixel data of a pixel element exceeds said predetermined threshold value, setting said threshold flag associated with said pixel element to a second value, said threshold flag having said second value for preventing further update of pixel data for said pixel element, wherein said threshold flag, once being set to said second value at said first exposure time, retains said second value through the remaining exposure times of said plurality of exposures times;

at each exposure time after the first exposure time, determining if pixel data of each of said pixel elements exceeds said predetermined threshold value;

if said pixel data of a pixel element exceeds said predetermined threshold value and said threshold flag associated with said pixel element has said first value, storing said pixel data in a location in a data memory associated with first pixel element and setting said threshold flag associated with said pixel element to said second value; and if said pixel data of a pixel element does not exceed said predetermined threshold value and said threshold flag associated with said pixel element has said first value, storing said pixel data for said pixel element in said location in said data memory.

12. The method of claim 11, further comprising:

when said pixel data of a pixel element exceeds said predetermined threshold value at said first exposure time, storing a time index value in a location in a time index memory associated with said pixel element, the time index value being indicative of said first exposure; and if said pixel data of a pixel element exceeds said predetermined threshold value and said threshold flag associated with said pixel element has said first value, storing a time index value in a location in a time index memory associated with said pixel element, the time index value being indicative of said exposure time when pixel data exceeds said predetermined threshold value.

13. The method of claim 11, wherein said plurality of exposure times comprises any of a relatively short exposure time for capturing image information that is related to high illumination areas in said image, a relatively long exposure time for capturing image information that is related to low illumination areas in said image, and intermediate exposure times for capturing image information that is related to gradually increasing illumination areas in said image; and wherein a combination of said multiple representations of said image at a plurality of exposure time establishes a wide dynamic range for said sensor array.

* * * * *